United States Patent [19]

Penzel et al.

[11] Patent Number: 4,663,384

[45] Date of Patent: May 5, 1987

[54] PAINTS AND RENDERS CONTAINING AQUEOUS DISPERSIONS OF VINYLIDENE CHLORIDE/(METH)ACRYLATE COPOLYMERS AS BINDERS

[75] Inventors: Erich Penzel, Ludwigshafen; Walter Prange, Mannheim; Michael Melan, Wachenheim; Eckehardt Wistuba, Bad Durkheim; Alfred Müeller, Biblis, all of Fed. Rep. of Germany

[73] Assignee: BASF Aktiengesellschaft, Ludwigshafen, Fed. Rep. of Germany

[21] Appl. No.: 793,831

[22] Filed: Nov. 1, 1985

[30] Foreign Application Priority Data

Nov. 8, 1984 [DE] Fed. Rep. of Germany ....... 3440792

[51] Int. Cl.$^4$ .................................................. C08L 27/00
[52] U.S. Cl. .................................... 524/519; 524/522; 524/523; 524/527; 524/555; 524/560
[58] Field of Search ............... 524/555, 522, 519, 523, 524/560, 527

[56] References Cited

U.S. PATENT DOCUMENTS

| | | |
|---|---|---|
| 3,787,232 | 1/1974 | Mikofalvy et al. |
| 4,341,679 | 7/1982 | Burgess et al. ...................... 524/833 |
| 4,543,386 | 9/1985 | Padget et al. ....................... 524/527 |
| 4,543,387 | 9/1985 | Padget et al. ....................... 524/519 |

Primary Examiner—Joseph L. Schofer
Assistant Examiner—N. Sarofim
Attorney, Agent, or Firm—Oblon, Fisher, Spivak, McClelland & Maier

[57] ABSTRACT

Paints and renders contain, as binders, aqueous dispersions of copolymers which have a minimum film-forming temperature of from $-15°$ to $20°$ C. and consist of
(a) from 10 to 50% by weight of vinylidene chloride, up to half of which may be replaced with vinyl chloride,
(b) from 44 to 88% by weight of esters of acrylic and/or methacrylic acid with alkanols of 1 to 18 carbon atoms and, if required, styrene, vinyl acetate, vinyl propionate or a mixture of these monomers and
(c) from 2 to 6% by weight of $\alpha,\beta$-monoolefinically unsaturated mono- and/or dicarboxylic acids of 3 to 5 carbon atoms and/or their amides.

1 Claim, No Drawings

PAINTS AND RENDERS CONTAINING AQUEOUS DISPERSIONS OF VINYLIDENE CHLORIDE/(METH)ACRYLATE COPOLYMERS AS BINDERS

Paints, and renders bound with synthetic resin are preferably produced using binders based on polymer dispersions. Where high requirements with respect to yellowing have to be met, the copolymer dispersions used are obtained from acrylates and methacrylates and have a water absorption (determined according to DIN 53,495) of about 15-25% by weight. However, in the case of high pigment contents, the paints produced using these binders tend to chalk and only just satisfy DIN 4102 in respect of fire behavior. Copolymer dispersions obtained from acrylates and styrene and having a water absorption of about 15-20% by weight have also been processed further. However, the paints and renders produced with these dispersions do not pass the flammability test according to DIN 4102. Furthermore, aqueous dispersions of copolymers of butadiene and styrene are capable of meeting less stringent requirements when used as binders, but the paints and renders produced with these are less lightstable, i.e. they yellow more readily, chalk very rapidly (after one year) and become brittle. They are therefore not very widely used.

Binders based on aqueous dispersions of vinyl esters have also been used, but these are less weather-resistant and less stable to hydrolysis, in particular if they contain vinyl acetate as the prinicipal comonomer.

European Pat. No. 64,228 discloses that the fire behavior of paints and of synthetic resin-bound renders can be improved if, during the preparation of the binder, an aqueous dispersion of a copolymer which contains not less than 70% by weight of vinyl chloride or vinylidene chloride as copolymerized units is mixed with a conventional aqueous dispersion of (meth)acrylate copolymers. Vinyl chloride copolymer dispersions are preferred in this context.

Furthermore, U.S. Pat. No. 4,110,296 discloses that aqueous copolymer dispersions of from 20 to 60% of ethylhexyl acrylate, from 10 to 40% of acrylonitrile and from 10 to 40% of halogen-containing monomers, such as vinylidene chloride, can be used as binders for paints and renders, pentachlorophenyl methacrylate and tribromophenyl methacrylate being preferred halogen-containing monomers. When these are used as binders, from 10 to 40% by weight, based on the amount of polymer, of triorganophosphates are also added. Although the fire behavior of the paints and renders can be improved in this way, an increased tendency to yellowing has to be accepted.

We have found that aqueous dispersions of copolymers which have a minimum film-forming temperature of from $-15°$ to $+20°$ C. and consist of (a) from 10 to 50% by weight of vinylidene chloride, up to half of which may be replaced with vinyl chloride, (b) from 44 to 88% by weight of esters of acrylic acid and/or methacrylic acid with alkanols of 1 to 18 carbon atoms and, if required, styrene, vinyl acetate, vinyl propionate or mixtures of these monomers, and (c) from 2 to 6% by weight of $\alpha,\beta$-monoolefinically unsaturated mono- and/or dicarboxylic acids of 3 to 5 carbon atoms and/or their amides may advantageously be used as binders in paints and renders, the percentages being based on the polymer.

The aqueous dispersions can be prepared in a conventional manner by emulsion copolymerization of the monomers, using the conventional emulsifiers and dispersants and the conventional water-soluble free radical polymerization initiators, such as alkali metal persulfates, advantageously in combination with water-soluble reducing agents, such as formaldehyde sulfoxylate, thiosulfate or sodium pyrosulfite. Preferred emulsifiers are alkylphenols reacted with ethylene oxide and/or the sulfates of these reaction products, these emulsifiers being employed in amounts of from 1 to 4, preferably from 1.5 to 2.5, % by weight, based on the monomers. The polymerization, in which the monomers can be added to the polymerization mixture as such or in emulsified form, is generally carried out at from 30° to 90° C., preferably from 50° to 70° C.

The amount of vinylidene chloride is preferably from 20 to 40% by weight, based on the total amount of monomers. Up to half of the vinylidene chloride may be replaced with vinyl chloride. The amount of (meth)acrylates and, where relevant, styrene, vinyl acetate or vinyl propionate is preferably from 66 to 78% by weight, and acrylates and methacrylates of alkanols of 1 to 4 carbon atoms are preferred, the corresponding acrylates being of particular interest. Particularly suitable monomers (c) are acrylic acid, methacrylic acid, acrylamide and methacrylamide, as well as crotonic acid, itaconic acid, maleic acid, crotonamide, itaconic acid monoamide and diamide and maleic acid monoamide and diamide. The amount of these is preferably from 2 to 4% by weight, based on the total amount of monomers.

The concentration of the aqueous vinylidene chloride copolymer dispersion can be varied within a wide range. It is generally from 40 to 60% by weight, but may also be higher or lower. In addition to the vinylidene chloride copolymer dispersions used as binders, it is also possible to employ other, conventional additives in the preparation of the paints and renders, for example thickeners, such as cellulose ethers, polyacrylic acid derivatives or thickeners based on polyurethanes, and film-forming assistants, such as mineral spirit, glycol ethers and glycol esters, as well as the conventional pigments, such as titanium dioxide (rutile) and fillers based on calcite or talc.

The novel paints and renders are distinguished in particular by a particularly long pot life and good processability. Moreover, they give paints and renders which are particularly water-resistant, do not exhibit any yellowing, and are flame-retardant according to DIN 4102. The water absorption according to DIN 53,495 is about 5-15% and is therefore very low. The surprisingly long setting time of the paints and renders is particularly advantageous when they are worked at fairly high temperatures, for example in sunlight during summer. In order to present a clearer picture of these facts, a copolymer of butyl acrylate and styrene is used as the binder and is compared with a dispersion according to Example 2. Both dispersions have virtually the same minimum film-forming temperature and both binders contain the same emulsifiers, assistants etc.

A structured render whose composition is indicated further below is applied to a non-absorptive substrate, and the render is then allowed to dry superficially. If the render is too soft, it cannot be provided with a structure. When it has an advantageous consistency, it is rubbed with a rendering trowel, the desired rough structure being formed. This is possible only within a very particular time span. If a longer time is allowed to elapse before rubbing is carried out, the render becomes detached from the wall.

The structured render containing the conventional binder could be rubbed with a rendering trowel after about 20 minutes. After about 25 minutes, the render had dried so thoroughly that it could no longer be worked.

A structured render containing the binder according to Example 2 was more flexible. It was possible to rub the render with a rendering trowel after only about 12 minutes, and it had set after only about 30 minutes.

When the structured render contains the novel binder, the setting time is longer. The same applies to a filler. Larger areas can be worked in one operation, resulting in fewer transition areas or joins.

This could not be foreseen since it is known that the drying rate of dispersion films is determined by the rate of evaporation of the water and not by the composition of the polymer (J. W. Vanderhoff, E. B. Bradford and W. K. Carrington in J. Polym. Sci., Symposium No. 41 (1973), 155). The low water absorption of the set paints and renders is very advantageous, resulting in a pronounced reduction in undesirable blushing, for example in colored renders. Another valuable property is the resistance to the growth of algae and of moss. The abrasion resistance of the claimed binders is substantially better than that of the known binders. The abrasion resistance or stability to washing is tested according to DIN 53,778. It has 1500 cycles in the case of the known binders and 2000–2500 cycles in the case of the novel binders, at a pigment volume concentration of 81%. The advantageous properties are retained at amounts of vinylidene chloride greater than 50%, but in this case yellowing increases, which is undesirable in the case of paints.

In the Examples which follow, parts and percentages are by weight, unless stated otherwise. A. Preparation of the aqueous vinylidene chloride copolymer dispersion

EXAMPLE 1

31.66 parts of water, 0.18 part of potassium persulfate and 0.18 part of a 40% strength aqueous solution of the sodium salt of a $C_{15}$-paraffinsulfonate are initially taken in a pressure-tight polymerization kettle having a capacity of 200 parts by volume. The catalyst is then flushed three times with nitrogen under 5 bar and is let down, and 9.5 parts by volume of feed I are introduced. The mixture is heated to 60°–70° C. and, when a temperature of 35° C. is reached, the continuous introduction of feeds I and II is begun. These feeds are introduced in the course of 4 hours. Thereafter, the reaction mixture is kept at 60° C. for 3 hours, flushed with nitrogen and then cooled, and the pH is brought to 7–9 with ammonia.

Feed I is an aqueous emulsion of 12.17 parts of water, 0.4 part of acrylamide, 0.6 part of acrylic acid, 12.06 parts of vinylidene chloride, 25.14 parts of n-butyl acrylate and 12.07 parts of methyl methacrylate, emulsified with a mixture of 2.06 parts of a 35% strength aqueous solution of the sodium salt of the sulfate of paraisooctylphenol oxyethylated with 25 moles of ethylene oxide and 1.26 parts of an aqueous 20% stength solution of paraisooctylphenol oxyethylated with 25 moles of ethylene oxide, and feed II is a solution of 0.09 part of sodium formaldehyde sulfoxylate in 2.13 parts of water.

The resulting aqueous dispersion has a solids content of 50.7%, an LT value of 81% and a minimum film-forming temperature (MFT) of 6° C. (the LT value is the light transmission, in percent, of an aqueous dispersion diluted to a solids content of 0.01% by weight)

EXAMPLE 2

Polymerization is carried out as described in Example 1, except that a mixture of 1.8 parts of acrylamide, 1.2 parts of acrylic acid, 20.1 parts of vinylidene chloride and 27.2 parts of isobutyl acrylate is used as feed I. An aqueous dispersion having a solids content of 50.2%, an LD value of 86% and an MFT of 15° C. is obtained under otherwise identical conditions.

EXAMPLE 3

Polymerization is carried out as described in Example 1, except that a monomer mixture consisting of 0.6 part of acrylamide, 0.9 part of acrylic acid, 5.03 parts of vinylidene chloride and 43.74 parts of methyl acrylate is introduced as feed I. An aqueous dispersion having a solids content of 50.5%, an LD value of 72% and an MFT of 13° C. is obtained.

EXAMPLE 4

Polymerization is carried out as described in Example 1, except that a feed I consisting of 0.75 part of acrylamide, 0.75 part of acrylic acid, 10.06 parts of vinylidene chloride, 28.15 parts of n-butyl acrylate and 10.56 parts of styrene is used. An aqueous dispersion having a solids content of 51.2%, an LT value of 82% and an MFT of 4° C. is obtained.

EXAMPLE 5

Polymerization is carried out as described in Example 1, except that a monomer mixture consisting of 0.8 part of methacrylamide, 1.21 parts of methacrylic acid, 15.08 parts of vinylidene chloride and 33.18 parts of ethyl acrylate is used as feed I.

A 48.9% strength aqueous polymer dispersion having an LT value of 91% and an MFT of 10° C. is obtained.

EXAMPLE 6

Polymerization is carried out as described in Example 1, except that a monomer mixture consisting of 0.5 part of acrylamide, 0.75 part of acrylic acid, 12.07 parts of vinylidene chloride, 15.58 parts of tert.-butyl acrylate and 21.37 parts of n-butyl acrylate is used as feed I.

A polymer dispersion having a solids content of 52.2%, an LT value of 89% and an MFT of 4° C. is obtained.

EXAMPLE 7

Polymerization is carried out as described in Example 1, except that a monomer mixture consisting of 1 part of acrylamide, 1 part of methacrylic acid, 10.06 parts of vinylidene chloride, 5.03 parts of vinyl chloride and 33.18 parts of isobutyl acrylate is used as feed I.

A polymer dispersion having a solids content of 49.2%, an LT value of 85% and an MFT of 4° C. is obtained.

EXAMPLE 8

Polymerization is carried out as described in Example 1, except that a monomer mixture consisting of 0.5 part of acrylamide, 1 part of acrylic acid, 25.15 parts of vinylidene chloride, 19.19 parts of vinyl propionate and 4.53 parts of butyl acrylate is used as feed I.

A polymer dispersion having a solids content of 50.1%, an LT value of 72% and an MFT of 17° C. is obtained. B. Paints and renders which contain the vinylidene chloride copolymer dispersion as a binder.

Using the vinylidene chloride copolymer dispersions prepared as described above, 1 masonry paint and one structured render were prepared in each case using the formulations stated below, and were tested as described below.

Masonry paint 145.5 parts of water, 27.4 parts of a 10% strength aqueous polyphosphate solution, 3.7 parts of a polyacrylic acid derivative, 3.7 parts of concentrated ammonia, 4.5 parts of a preservative, 225 parts of a 2% strength aqueous solution of a cellulose ether, 18 parts of mineral spirit, 18 parts of butyl acetate, 106.5 parts of titanium dioxide, 18 parts of aluminum silicate, 750 parts of calcium carbonate having a mean particle size of 5 $\mu$m, 1.1 parts of a commercial antifoam based on silicone, and 836.9 parts of a 50% strength dispersion as described in Examples 1 to 8. The paint has a pigment volume concentration of 45%.

Structured render 131.0 parts of a 50% strength dispersion as described in Examples 1 to 8, 19.5 parts of a 10% strength aqueous sodium polyphosphate solution, 2 parts of a preservative, 8.3 parts of an 8% strength aqueous solution of a polyacrylic acid derivative, 10 parts of mineral spirit (boiling within the range from 180° to 210° C.), 10 parts of butyldiglycol, 1.3 parts of a 66% strength aqueous polyalkylene wax dispersion, 28 parts of titanium dioxide (rutile), 459 parts of calcium carbonate having a mean particle size of 40 $\mu$m, 256 parts of calcium carbonate having a mean particle size of 130 $\mu$m, 43 parts of shingle having a particle size of from 1.5 to 2 mm, and 1.3 parts of a commercial antifoam based on silicone, diluted 1:1 with butyl acrylate, and 30 parts of water.

The binder content is about 6.5%, the solids content about 86% and the specific gravity about 1.9 g/cm$^3$.

Test

The masonry paints and the structured renders were applied in a thickness of about 50 $\mu$m (paints) or about 2.5 mm (renders), in a conventional manner, onto a primed, rendered outside wall, a stainless steel rendering trowel being used for the structured render. The masonry paints and structured renders were weathered for 2 years. After this time, the masonry paints showed virtually no change compared with the initial state, ie. they had not yellowed, were only very slightly soiled and exhibited only slight chalking. After the weathering, the renders were virtually completely unsoiled and did not possess any cracks. Moreover, the painted and rendered surfaces were free of algae and moss growth.

We claim:

1. A paint or render containing a pigment and a filler, and, as a binder, an aqueous dispersion of a copolymer which has a minimum film-forming temperature of from $-15°$ to $+20°$ C. and consists of
   (a) from 10 to 50% by weight of vinylidene chloride, up to half of which may be replaced with vinyl chloride,
   (b) from 44 to 88% by weight of esters of acrylic and/or methacrylic acid with alkanols of 1 to 18 carbon atoms and, if required, styrene, vinyl acetate, vinyl propionate or a mixture of these monomers, and
   (c) from 2 to 6% by weight of $\alpha,\beta$-mono-olefinically unsaturated mono- and/or dicarboxylic acids of 3 to 5 carbon atoms and/or acrylamide, methacrylamide, crotonamide, itaconic monoamide or diamide, and maleic acid monoamide or diamide the percentages being based on the copolymer.

* * * * *